United States Patent [19]

Bourland

[11] 4,361,507

[45] Nov. 30, 1982

[54] CABLE FILLER COMPOSITION CONTAINING (A) CRYSTALLINE POLYPROPYLENE HOMOPOLYMER, (B) STYRENE BLOCK COPOLYMER AND (C) MINERAL OIL

[75] Inventor: Larry G. Bourland, Murrysville, Pa.

[73] Assignee: Arco Polymers, Inc., Philadelphia, Pa.

[21] Appl. No.: 198,404

[22] Filed: Oct. 20, 1980

[51] Int. Cl.$^3$ .............................................. C08K 5/01
[52] U.S. Cl. ................................. 523/173; 174/23 R; 174/23 C; 524/505; 525/95
[58] Field of Search ................. 525/95; 260/33.6 AQ, 260/33.6 PQ, 33.6 VA; 174/23 R, 23 C

[56] References Cited

U.S. PATENT DOCUMENTS

| | | | |
|---|---|---|---|
| 3,478,128 | 11/1969 | Hagemeyer et al. | 525/95 |
| 3,830,953 | 8/1974 | Wood et al. | 260/33.2 R |
| 3,865,776 | 2/1975 | Gergen | 260/33.6 AQ |
| 3,879,575 | 4/1975 | Dobbins et al. | 260/33.6 VA |
| 4,032,492 | 7/1977 | Englund et al. | 260/28.5 A |
| 4,076,659 | 2/1978 | Harper | 260/33.6 AQ |
| 4,105,619 | 8/1978 | Kaufman et al. | 260/33.6 PQ |
| 4,132,698 | 1/1979 | Gessler et al. | 260/33.6 AQ |
| 4,136,699 | 1/1979 | Collins et al. | 260/33.6 AQ |
| 4,176,240 | 11/1979 | Sabia | 260/33.6 AQ |
| 4,198,983 | 4/1980 | Becker et al. | 525/95 |
| 4,220,579 | 9/1980 | Rinehart | 260/33.6 AQ |

FOREIGN PATENT DOCUMENTS

| | | |
|---|---|---|
| 1307 | 4/1979 | European Pat. Off. . |
| 1532350 | 11/1978 | United Kingdom . |
| 2001657 | 2/1979 | United Kingdom . |

OTHER PUBLICATIONS

Chem. Abst. vol. 74 #22 (127177n) Legge et al. (Shell) Ger. Off. 2,034,725 "Elastomeric . . . Copolymer Blends"..

Derwent Abst. 92188 B/51 Toyray Indust. (J.79039577) 11-28-79.

Primary Examiner—Herbert J. Lilling
Attorney, Agent, or Firm—Dennis M. Kozak

[57] ABSTRACT

A cable filler composition comprises a mixture of a mineral oil, a styrene-ethylene-butylene-stryene block copolymer and 2 to 6 weight percent of an isotactic, crystalline polypropylene, the polypropylene having an average molecular weight of between 20,000 and 50,000.

4 Claims, No Drawings

CABLE FILLER COMPOSITION CONTAINING (A) CRYSTALLINE POLYPROPYLENE HOMOPOLYMER, (B) STYRENE BLOCK COPOLYMER AND (C) MINERAL OIL

BACKGROUND OF THE INVENTION

The use of mineral oil compositions containing a polyethylene polymer of specific properties in the formation of cable filler compositions has been described, for example in U.S. Pat. Nos. 4,176,240 and 3,879,575. As described in U.S. Pat. No. 4,176,240, the contents of which are incorporated by reference herein, compositions for use as filling material can be prepared by admixing mineral oil, a styrene-ethylene butylene-styrene block copolymer, and a polyethylene which has a softening point of between 110°–130° C. Such compositions have been found to have improved handling characteristics over petroleum jelly-polyethylene cable filling materials.

It has now been found that a cable filling composition having excellent properties may be formed by admixing mineral oil, a styrene-ethylene butylene-styrene block copolymer and an isotactic, crystalline polypropylene polymer having an average molecular weight of between 20,000 and 50,000.

SUMMARY OF THE INVENTION

A cable filler composition having improved properties is formed by admixing with mineral oil and a styrene-ethylene butylene-styrene block copolymer, about 2 to 6 percent by weight of an isotactic, crystalline polypropylene, the polypropylene having an average molecular weight of between 20,000 and 50,000.

The present invention provides a filler composition that has a higher drop melting point that known compositions and also provides a softer composition which enables easy processing and workability in the filling of electrical cables.

DETAILED DESCRIPTION

The present invention is a novel composition for use as a cable filler, which has a higher drop melting point than known compositions and a softer, more workable consistency.

The cable filler composition comprises mineral oil, a styrene-ethylene butylene-styrene block copolymer, and a low molecular weight isotactic, crystalline polypropylene thermoplastic. The low molecular weight polypropylene homopolymer, of the general formula:

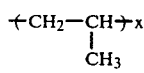

is a semi-crystalline isotactic polymeric material that may be formed by degradation of higher molecular weight polypropylene. The low molecular weight polypropylenes for use in the present invention have an average molecular weight of 20,000 to 50,000. Such low molecular weight polypropylenes have a melting point of about 148° C. and are soft materials readily dissolved in a mineral oil, at temperatures at or slightly above their melting points.

If an isotactic, crystalline polypropylene of an average molecular weight in excess of about 50,000 is attempted for use in the compositions, the polymer will not sufficiently dissolve in the mineral oil to give a usable mixture, while use of such a polymer having a molecular weight below about 20,000 will result in a composition not having sufficient stability for the intended use.

The mineral oil should be present in an amount of between 87–91 percent by weight of the composition, while the styrene-ethylene butylene-styrene block copolymer should be present in an amount of between 5–7 percent by weight of the composition.

The amount of isotactic, crystalline polypropylene having an average molecular weight of 20,000–50,000 that is present in the composition is between 2–6 percent by weight of the composition.

There may, as is known, be added small amounts, generally below 2 percent of the composition, of various stabilizing or compatibilizing compounds, such as antioxidants.

EXAMPLE I

As an example of the composition of the present invention, a cable filling composition (Composition A) was prepared from 88.5 percent mineral oil (Drakeol 35) 5.9 percent of a styrene-ethylene butylene-styrene block copolymer (Kraton 1652G-Shell Chemical Company) and 4.6 percent by weight of a low molecular weight isotactic, crystalline polypropylene, having an average molecular weight of 46,300. Krotinex 100 in an amount of 0.8% and Irganox 1035 in an amount of 0.2% were also added. This composition was compared with a conventional composition (Control) which contained the same components except that there were substituted for the polypropylene, 4.6 percent of a conventional low molecular weight polyethylene wax (AC-9; Allied Chemical Corp.).

The properties of these two compositions are compared in Table I:

TABLE I

| Composition | Dissolution Temp. (C.) | Drop Melting Point (C.) | Cloud Point (C.) | Redissolution Temp. (C.) |
|---|---|---|---|---|
| Control | 156 | 92 | 92 | 108 |
| A | 159 | 127.6 | 113 | 143–146 |

The increase in drop melting point of the composition of the present invention over the Control is highly advantageous in that such a higher drop melting point will result in resistance to flow at elevated temperature experienced in service operations.

The two above compositions were also compared as to elastic modulus to determine the relative softness of the two compositions. Elastic modulus was determined using a Rheometrics mechanical spectrometer at a frequency of 1 radian per second at a temperature of 40° C. The elastic modulus of Composition A was $4.0 \times 10^4$ dynes/cm$^2$, while the elastic modulus of the Control was $1.3 \times 10^5$ dynes/cm$^2$. A relative difference was also noted at a range of frequency from 0.1 to 100 radians sec for the two compositions. The decrease in elastic modulus of Composition A shows the same to be a softer composition, more precessible, when compared with the known compositions.

EXAMPLE II

A series of compositions were formed containing the percent by weight of rubber, "R" (Kraton G, a styrene-ethylene butylene-styrene block copolymer), and percent by weight of thermoplastic polymer "P"; wherein A=an isotactic, crystalline polypropylene having an average molecular weight of 46,300, B=an isotactic, crystalline polypropylene having an average molecular weight of 36,600, and C=a low molecular weight polyethylene wax (AC-9); as indicated in the following table, Krotinex 100 in an amount of 0.8%, Irganox 1035 in an amount of 0.2%, and the remainder mineral oil. The Brookfield viscosities of the compositions at 130° C. were compared giving the results listed in Table II:

TABLE II

| Thermo-plastic Polymer | Brookfield Viscosity at 130° C. (cps) Percent Polymer (P) and Rubber (R) | | |
|---|---|---|---|
| | 4.6% P + 4.9% R | 4.7% P + 4.9% R | 3% P + 6% R |
| A | 59.7 | 46.4 | 43.4 |
| B | 46.8 | n/r | 42.6 |
| C | 35.5 | 27.3 | 33.9 | n/r — not recorded

The composition containing the isotactic, crystalline polypropylene, as is illustrated, had Brookfield viscosities indicating that the polypropylene compositions had viscosities sufficiently comparable to the polyethylene waxes so as to provide usable viscosity mixtures.

The drop melting points of the composition containing 4.6% Polymer and 4.9% Rubber were also determined with the following results: A=129° C., B=132° C. and C=91° C., showing the higher drop melting points of the compositions of the present invention over the conventional compositions.

I claim:

1. In a cable filling composition for use in waterproofing electrical cables wherein a thermoplastic polymer is admixed with a styrene-ethylene butylene-styrene block copolymer and mineral oil in an amount of 87–91 percent by weight of said composition, the improvement wherein said thermoplastic polymer comprises an isotactic, crystalline, polypropylene homopolymer having an average molecular weight of between 20,000 and 50,000.

2. In a cable filling composition for use in waterproofing electrical cables as defined in claim 1, the improvement wherein said styrene-ethylene butylene-styrene block copolymer is present in an amount of 5–7 percent by weight of said composition.

3. In a cable filling composition for use in waterproofing electrical cables as defined in claim 1, the improvement wherein said isotactic, crystalline, polypropylene is present in an amount of 2–6 percent by weight of said composition.

4. In a cable filling composition for use in waterproofing electrical cables wherein a thermoplastic polymer is admixed with a styrene-ethylene butylene-styrene block copolymer and mineral oil, the improvement wherein said composition comprises 87–91 percent by weight of said mineral oil, 5–7 percent by weight of said styrene-ethylene butylene-styrene block copolymer, and 2–6 percent by weight of a thermoplastic polymer consisting essentially of an isotactic, crystalline, polypropylene having an average molecular weight of between 20,000 and 50,000.

* * * * *